(12) United States Patent
Baek et al.

(10) Patent No.: US 11,303,153 B2
(45) Date of Patent: Apr. 12, 2022

(54) WIRELESS CHARGING PAD AND WIRELESS CHARGING APPARATUS

(71) Applicant: LG ELECTRONICS INC., Seoul (KR)

(72) Inventors: Jongseok Baek, Seoul (KR); Byunghyuk Lee, Seoul (KR); Yongnam Cho, Seoul (KR); Yonghwan Shin, Seoul (KR); Bohwan Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 442 days.

(21) Appl. No.: 16/361,865

(22) Filed: Mar. 22, 2019

(65) Prior Publication Data

US 2019/0296578 A1 Sep. 26, 2019

(30) Foreign Application Priority Data

Mar. 22, 2018 (KR) .................. 10-2018-0033435
Aug. 8, 2018 (KR) .................. 10-2018-0092181

(51) Int. Cl.
*H02J 50/05* (2016.01)
*B60L 53/122* (2019.01)
*H02J 7/02* (2016.01)

(52) U.S. Cl.
CPC ............ *H02J 50/05* (2016.02); *B60L 53/122* (2019.02); *H02J 7/025* (2013.01)

(58) Field of Classification Search
CPC ....................................... H02J 50/05
USPC ........................................... 320/108
See application file for complete search history.

(56) References Cited

U.S. PATENT DOCUMENTS

| | | | |
|---|---|---|---|
| 2010/0277120 A1 | 11/2010 | Cook et al. | |
| 2013/0188397 A1 | 7/2013 | Wu et al. | |
| 2016/0126917 A1* | 5/2016 | Ahn ..................... | H03H 7/0115 333/185 |
| 2016/0241061 A1 | 8/2016 | Werner et al. | |
| 2017/0187243 A1* | 6/2017 | Sugiyama ............. | B60L 53/122 |
| 2018/0076671 A1 | 3/2018 | Chopra et al. | |
| 2019/0221353 A1* | 7/2019 | Hwang ................ | C09D 163/00 |

FOREIGN PATENT DOCUMENTS

| | | | |
|---|---|---|---|
| JP | 2016103612 | * 6/2016 | ............. B60L 11/18 |
| KR | 1020130082119 | 7/2013 | |
| KR | 101318395 | 10/2013 | |
| KR | 1020160073303 | 6/2016 | |
| KR | 101756224 | 7/2017 | |
| WO | WO2017044973 | 3/2017 | |

OTHER PUBLICATIONS

European Search Report in EP Appln. No. 19770317.6, dated Nov. 10, 2021, 16 pages.

* cited by examiner

*Primary Examiner* — Edward Tso
*Assistant Examiner* — Ahmed H Omar
(74) *Attorney, Agent, or Firm* — Fish & Richardson P.C.

(57) ABSTRACT

A wireless charging pad includes a ferrite plate, a coil disposed at the ferrite plate, and a resonance tank that includes a flat type capacitor. The flat type capacitor is configured to reduce an impedance of the coil.

20 Claims, 18 Drawing Sheets

WIRELESS CHARGING PAD AND WIRELESS CHARGING APPARATUS

CROSS-REFERENCE TO RELATED APPLICATIONS

This application claims the priority benefit of Korean Patent Application No. 10-2018-0033435, filed on Mar. 22, 2018, and Application No. 10-2018-0092181, filed on Aug. 8, 2018, in the Korean Intellectual Property Office, the disclosures of which are incorporated herein by reference.

TECHNICAL FIELD

The present disclosure relates to a wireless charging pad and a wireless charging apparatus.

BACKGROUND

A wireless charging system may supply electrical energy to an electronic device.

For example, a wireless charging system of a mobile terminal and a wireless charging system for an electric vehicle have been in development. In some cases, a wireless charging system may include various electronic components such as a wireless charging pad and a resonance tank for compensating for an impedance.

In some examples, a wireless charging system may include a DDQ coil pad structure without a resonance part, and a resonance tank manufactured separately from a wireless charging pad. In some cases, where a power transmitting apparatus is made by a manufacturer different from a manufacturer of a power receiving apparatus, a housing and a heat-dissipating structure may need to be changed to modify a parameter for the resonance part. In some cases, a high induced voltage may occur at both ends of a coil. The wireless charging pad may include a coil that has one end coming out of the pad to secure an insulation distance. This wireless charging pad may have an increased volume and have a non-flat shape.

In some cases, a charging system may include a structure for reducing an electromagnetic interference of a wireless power transmitting device in which a magnetic body attached with a PCB is placed at the bottom of a wireless charging pad in order to reduce an electromagnetic interference. The PCB placed at the bottom of the magnetic body may shield a magnetic flux, but may cause an increase of a volume of the PCB and the device.

SUMMARY

The present disclosure provides a wireless charging pad having a resonance part of which a parameter is capable of being easily modified.

In addition, the present disclosure provides a wireless charging pad which has a resonance having a parameter capable of being easily modified so that the wireless charging pad is able to be generalized, and which is capable of being manufactured in a slim shape using a flat type capacitor.

In addition, the present disclosure provides a wireless charging pad capable of being made flat as there are provided a hole for inserting a wire into a plate and a groove for aligning the wire.

The present disclosure further provides a wireless charging pad capable of addressing heat emission and electric Magnetic Compatibility (EMC) while accommodating an electronic component within a wireless charging pad.

In addition, the present disclosure provides a wireless charging pad manufactured in a flat shape and thus having a minimum volume without an additional space for an electronic component.

In addition, the present disclosure provides a wireless charging pad in which magnetic bodies are provided in two layers to position an electronic component in an empty space.

According to one aspect of the subject matter described in this application, a wireless charging pad includes a ferrite plate, a coil disposed at the ferrite plate, and a resonance tank including a flat type capacitor. The flat type capacitor is configured to reduce an impedance of the coil.

Implementations according to this aspect may include one or more of the following features. For example, the flat type capacitor may be disposed vertically below the ferrite plate. In some examples, the ferrite plate may define a hole that penetrates a top surface of the ferrite plate and a bottom surface of the ferrite plate, and the flat type capacitor may be electrically connected with the coil by a first wire inserted through the hole.

In some examples, the ferrite plate may define a groove at the bottom surface, and the flat type capacitor may be electrically connected with an external device by a second wire disposed in the groove. In some examples, the flat type capacitor may include a first capacitor that is connected electrically in series with the coil by the first wire, and a second capacitor that is connected electrically in series with the first capacitor and that is connected with the external device by the second wire.

In some implementations, the wireless charging pad may further include an aluminum plate disposed vertically below the ferrite plate, and an insulation sheet disposed between the aluminum plate and the flat type capacitor. In some implementations, the ferrite plate may include a plurality of ferrite plates, and the flat type capacitor may be disposed between any two of the plurality of ferrite plates. In some examples, the flat type capacitor may include a first capacitor connected electrically in series with the coil, and a second capacitor connected electrically in series with the first capacitor.

In some implementations, the coil may include a plurality of sub-coils, and the flat type capacitor may include a plurality of capacitors. The plurality of sub-coils and the plurality of capacitors may be alternately connected electrically in series in which one capacitor of the plurality of capacitors is connected between two sub-coils of the plurality of sub-coils. In some examples, each of the plurality of ferrite plates may include two straight sides, in which each straight side extends from a first end to a second end, a first arc side that connects the first ends of the two straight sides and that has a first radius of curvature, and a second arc side that connects the second ends of the two straight sides and that has a second radius of curvature greater than the first radius of curvature.

According to another aspect, a wireless charging pad includes a first ferrite plate disposed at a first layer of the wireless charging pad, a second ferrite plate disposed at a second layer of the wireless charging pad, in which the second ferrite plate is disposed vertically above or below the first ferrite plate, and a coil that is wound around the first ferrite plate and that is disposed vertically above or below the second ferrite plate.

Implementations according to this aspect may include one or more of the following features. For example, at least a part of the second ferrite plate may be in contact with at least a part of the first ferrite plate. In some examples, the first ferrite plate and the second ferrite plate may be configured to define a continuous magnetic path passing the first ferrite plate and the second ferrite plate. In some examples, the second ferrite plate may define an accommodation space configured to accommodate an electronic component.

In some implementations, at least a part of the first ferrite plate may overlap with the accommodation space. In some examples, the coil may be disposed at the first layer. In some examples, the electronic component may be disposed at the second layer, and the electronic component may include at least one of a converter, an inverter, a rectifier, or a resonance tank.

In some implementations, the second ferrite plate may include a plurality of sub-magnetic bodies, and the coil may include a lead-in wire and a lead-out wire that are disposed in a gap defined between the plurality of sub-magnetic bodies.

In some implementations, the second ferrite plate may be configured to, based on the electronic component being disposed in the accommodation space of the second ferrite plate, define a first internal impedance of the lead-in wire and the lead-out wire to be less than a second internal impedance of the lead-in wire and the lead-out wire defined without the electronic component disposed in the accommodation space.

In some implementations, the wireless charging pad may further include an insulator disposed between the first ferrite plate and the coil.

The details of other implementations are included in the following description and the accompanying drawings.

According to the present disclosure, there are one or more effects as below.

First, as a resonance tank is included, it may be possible to generalize a wireless charging pad.

Second, as a flat type capacitor is included in a resonance tank, it may be possible to manufacture a wireless charging pad in a slim shape.

Third, as a hole and a groove are provided in a ferrite plate, it may be possible to manufacture a wireless charging pad in a flat shape.

Fourth, as electronic components such as a resonance tank is included in a wireless charging pad, it may be possible to easily modify a parameter for a resonance part and easily generalize a wireless charging pad.

Fifth, it may be possible to minimize a volume of a wireless charging pad even without an additional space for an electronic component such as a resonance tank.

Sixth, it may be possible to manufacture a wireless charging pad in a flat shape.

Effects of the present disclosure should not be limited to the aforementioned effects, and effects that have not been mentioned above or additional effects of the present application may become apparent to those having ordinary skill in the art from the description presented below.

BRIEF DESCRIPTION OF THE DRAWINGS

The implementations will be described in detail with reference to the following drawings in which like reference numerals refer to like elements.

DETAILED DESCRIPTION

Figure 1:
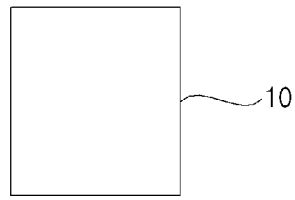
FIG. 1 is a diagram showing an external appearance of an example wireless charging system.
Figure 1:
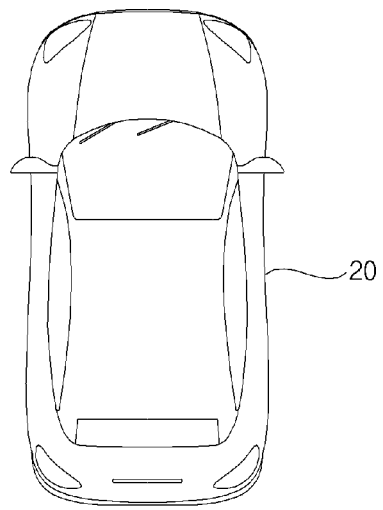

FIG. 1 illustrates an external appearance of an example wireless charging system.

Figure 2:
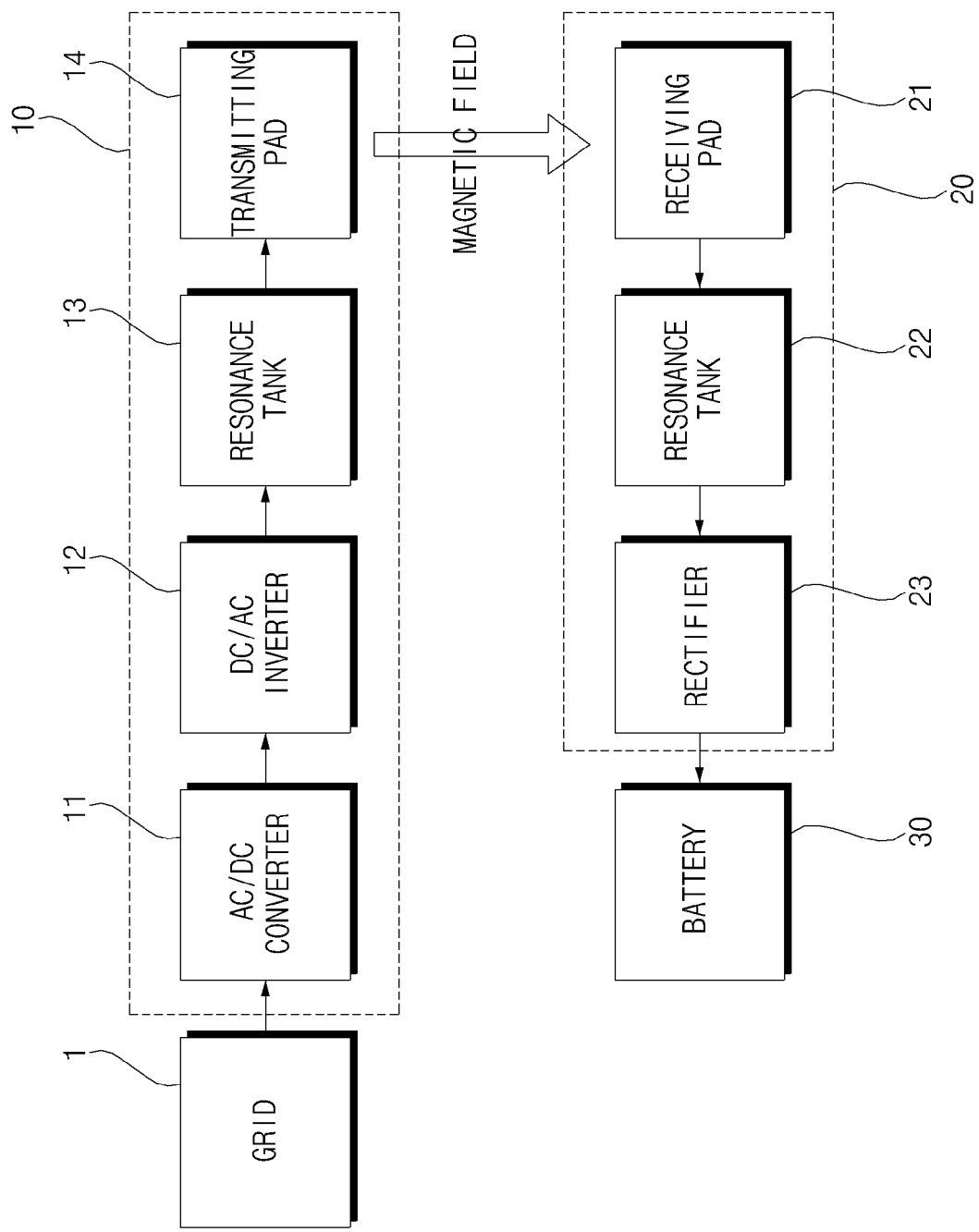
FIG. 2 is a block diagram of an example wireless charging system.

FIG. 2 illustrates a block diagram of an example wireless charging system.

Referring to the drawings, a wireless charging system 100 may include a power transmitting apparatus 10 and a power receiving apparatus 20. The wireless charging system 100 may be used for wireless charging of an electric vehicle battery, wireless charging of a robot cleaner, wireless charging of a mobile terminal battery, etc.

In the case where the wireless charging system 100 is used for wireless charging of an electric vehicle battery, the power transmitting apparatus 10 may be installed at a charging station or the like, and the power receiving apparatus 20 may be provided in a vehicle. In the case where the wireless charging system 100 is used for wireless charging of a robot cleaner, the power transmitting apparatus 10 may be configured as a portable type, and the power receiving apparatus 20 may be provided in the robot cleaner. In the case where the wireless charging system 100 is used for wireless charging of a mobile terminal battery, the power transmitting apparatus 10 may be configured as a portable type, and the power receiving apparatus 20 may be provided in a mobile terminal.

The power transmitting apparatus 10 may include an AC/DC converter 11, a DC/AC inverter 12, a resonance tank 13, and a transmitting pad 14. The AC/DC converter 11 may convert AC electrical energy provided from a grid 1 into DC electrical energy. The DC/AC inverter 12 converts the DC electric energy into AC electric energy. In this case, the DC/AC inverter 12 may generate a high-frequency signal of few dozens or hundreds of kHz. The resonance tank 13 may compensate for impedance appropriately for wireless charging. The transmitting pad 14 transmits electrical energy wirelessly. The transmitting pad 14 includes a transmitting coil 15.

The power receiving apparatus 20 may include a receiving pad 21, a resonance tank 22, and a rectifier 23. The receiving pad receives electric energy wirelessly. The receiving pad 21 includes a receiving coil 25. The transmitting pad 14 and the receiving pad 21 include a coil set (the transmitting coil 15 and the receiving coil 25) having magnetic coupling. The transmitting pad 14 and the receiving pad 21 delivers electric energy through a medium of a magnetic field without physical electrical contact between electrodes. The resonance tank 22 compensates for impedance appropriately for wireless charging. The rectifier 23 converts AC electric energy into DC electric energy to supply the DC electric energy to the battery 30.

Figure 3:
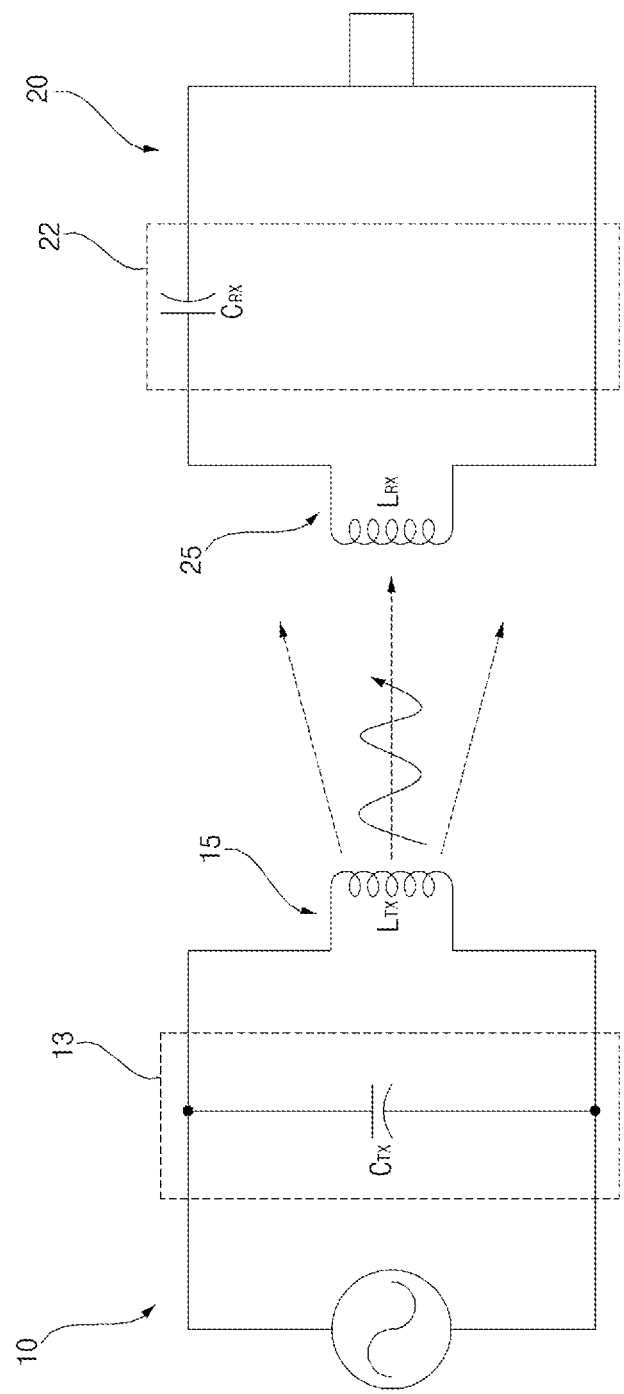
FIG. 3 is a diagram for explanation of an example wireless charging method.

FIG. 3 illustrates a wireless charging method.

Referring to FIG. 3, the wireless charging system may employ inductive coupling or resonance coupling.

Inductive coupling works on the principle that, when intensity of a current flowing in a primary coil between two adjacent coils is changed, a magnetic field is changed by the current and in turn a magnetic flux passing through a secondary coil is changed to thereby generate an induced electromotive force on the side of the secondary coil. That is, if two coils are placed close to each other and only a current of the primary coil is changed, an induced electromotive force may be generated even though two wires are not moved spatially. In this case, frequency characteristics are not influenced greatly. However, power efficiency may be affected depending on alignment and distance between a transmitting apparatus (for example, a wireless charging apparatus) including the respective coils and a receiving apparatus (for example, a mobile terminal).

Resonance coupling works on the principle that, when two coils are at a specific distance, a resonant frequency is applied to a primary coil between the two coils to thereby generate variation of a magnetic field and some of the variation is applied to a secondary coil having the same resonant frequency to thereby generate an induced electromotive force. According to this method, if a transmitter and a receiver resonate at the same frequency, a magnetic wave is transferred through a near magnetic field. Thus, if the transmitter and the receiver have different frequencies, energy is not transferred therebetween. In this case, selecting a frequency may be important. Energy is not transferred between resonant frequencies which are at a specific distance or more, and a device to be charged may be selected by selecting a resonant frequency. If a single device is allocated to each resonant frequency, selecting a resonant frequency may be equivalent to selecting a device to be charged.

Resonance coupling has advantages over inductive coupling in that power efficiency is relatively less affected by alignment of a transmitter, including the respective coils, and a receiver and a distance between the transmitter and the receiver.

Figure 4:
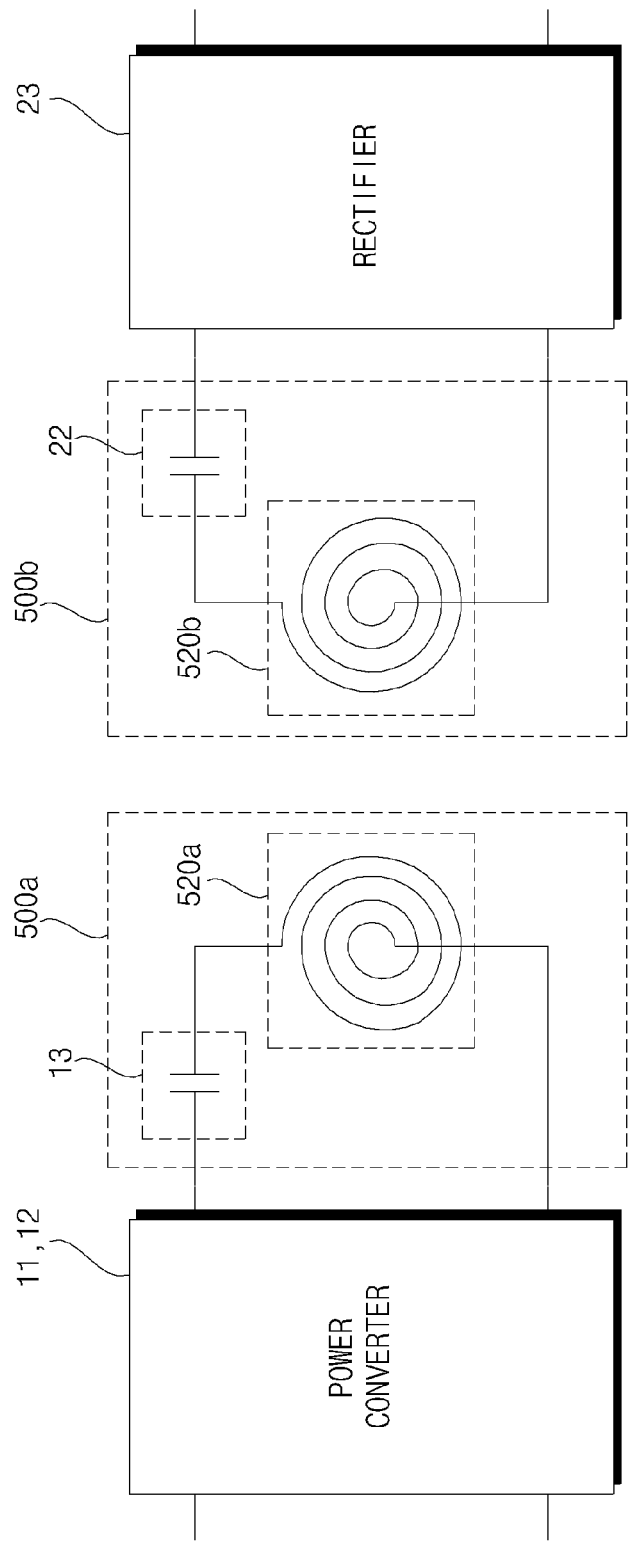
FIG. 4 shows an example of an example equivalent circuit of an example wireless charging pad.

FIG. 4 illustrates an example of an equivalent circuit of a wireless charging pad.

A wireless charging pad 500 according to an implementation of the present disclosure may be used as a transmitting pad 14 of a power transmitting apparatus 10 or a receiving pad 21 of a power receiving apparatus 20. In some cases, the wireless charging pad 500 may be used for wireless charging of a small-sized device such as a mobile terminal. In some examples, the wireless charging pad 500 may be used for wireless charging of a large-sized device such as an electric vehicle.

Referring to FIG. 4, the wireless charging pad 500 may be used as a power transmitting pad 500a or a power receiving pad 500b. The power transmitting pad 500a may include a resonance tank 13 and a power transmitting coil 520a. The power transmitting pad 500a may be electrically connected with a power converter 11 and 12. The power converter 11 and 12 may include the AC/DC converter 11 and the DC/AC converter 12 described above with reference to FIG. 2. The power receiving pad 500b may include a resonance tank 22 and a power receiving coil 520b. The power receiving pad 500b may be electrically connected with a rectifier 23.

Figure 5:
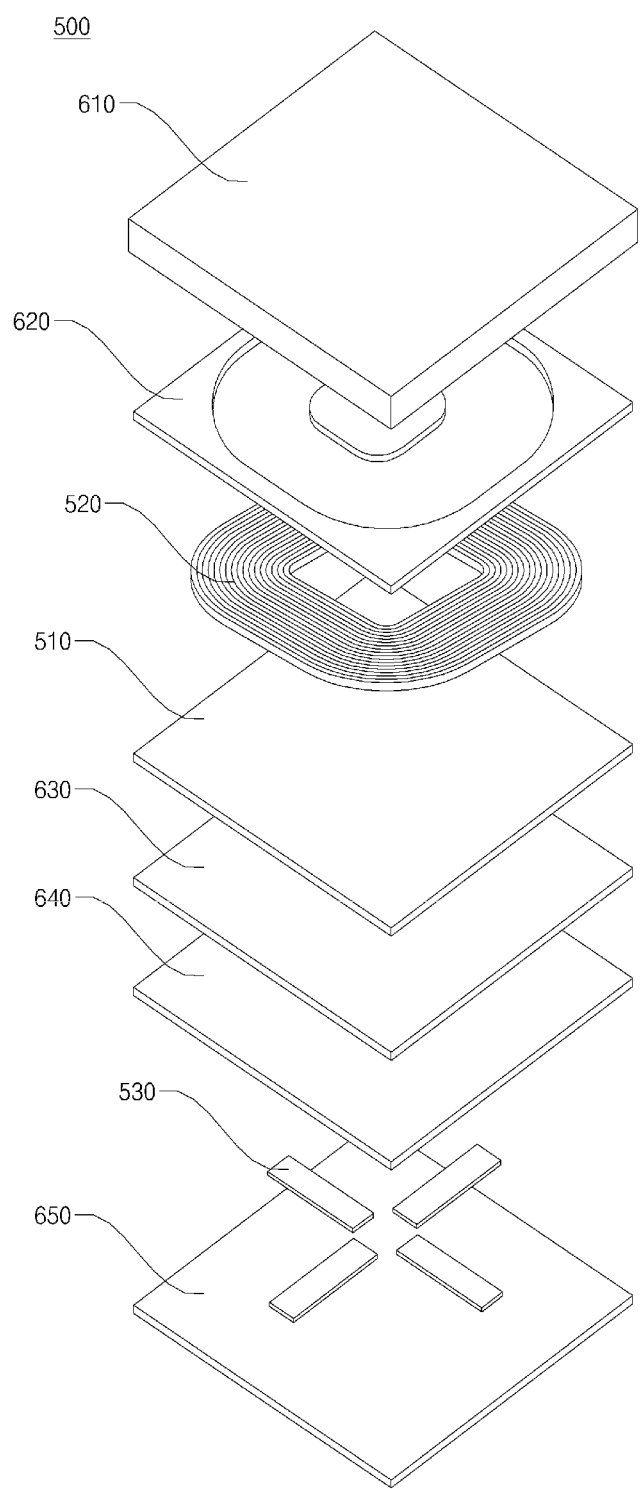
FIGS. 5 to 6B are diagrams for explanation of an example wireless charging pad.
Figure 6A:
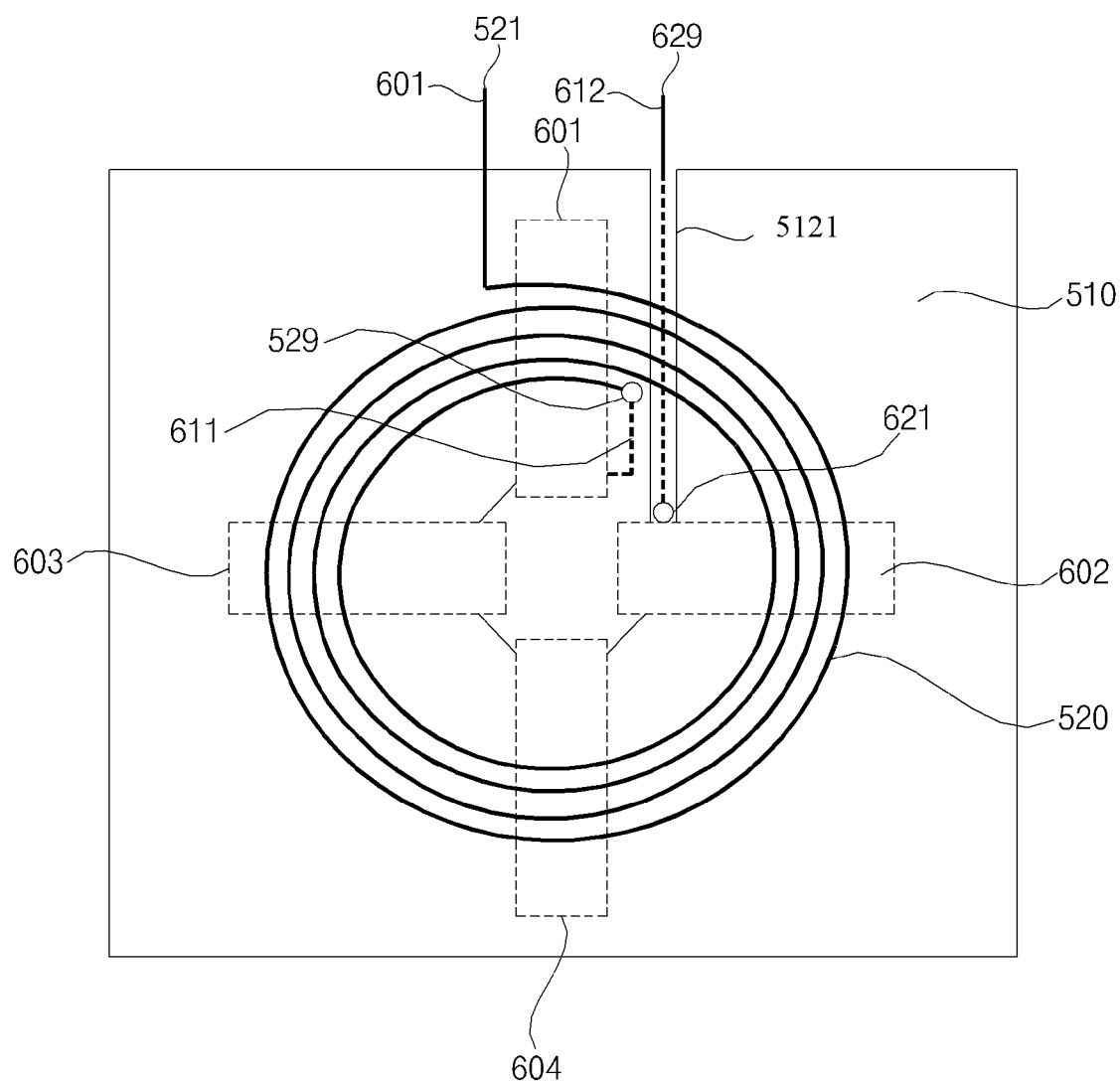
Figure 6B:
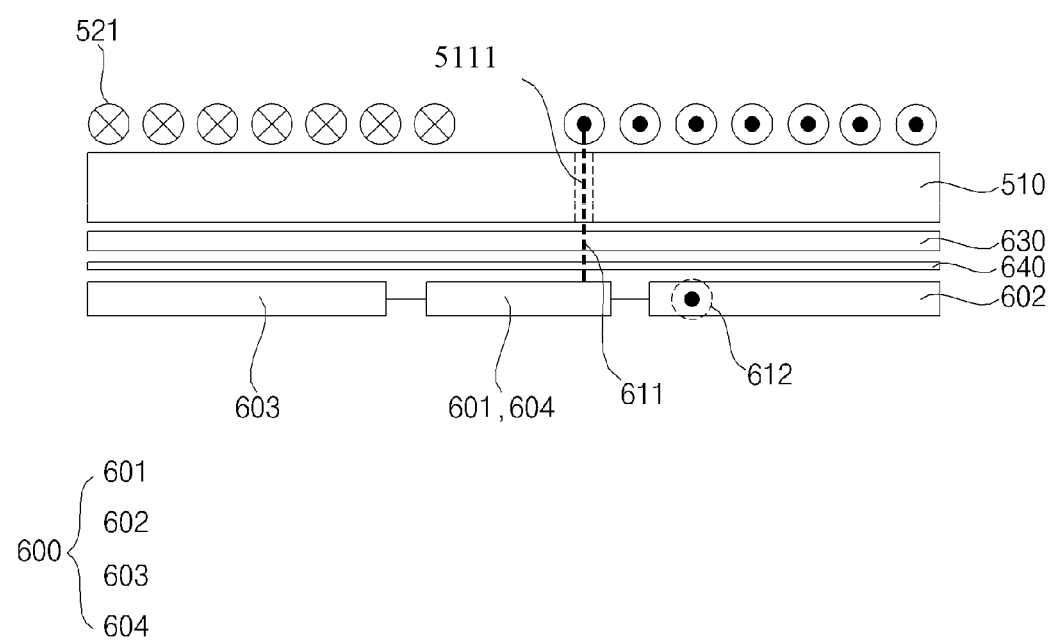

FIGS. 5 to 6B illustrate an example wireless charging pad according.

FIG. 5 is an exemplary exploded perspective view of a wireless charging pad.

FIG. 6A is an exemplary top view of a wireless charging pad, which primarily shows a coil 520, a ferrite plate 510, and a resonance tank 530.

FIG. 6B shows a side view of a wireless charging pad, which primarily shows the coil 520, the ferrite plate 510, and the resonance tank 530.

Referring to FIGS. 5 to 6B, a wireless charging pad 500 may include: a top case 610, a coil guide 620, at least one coil 520, at least one ferrite plate 510, an aluminum plate 630, an insulation sheet 640, a resonance tank 530, and a bottom case 650.

A top case 610 may form the external appearance of the wireless charging pad 500 together with the bottom case 650.

The top case 610 may be coupled to the bottom case 650 to form a space therebetween. The coil guide 620, the at least one coil 520, the at least one ferrite plate 510, the aluminum plate 630, the insulation sheet 640, and the resonance tank 530 may be accommodated in the space formed by the top case 610 and the bottom case 650.

The coil guide 620 may be disposed on the at least one coil 520.

When coupled to the at least one coil 1520, the coil guide 620 may restrict the at least one coil 520 so that the at least one coil 1520 is fixed and not allowed to move.

The at least one coil 520 may be formed in spiral, and have a shape that is a circular, elliptical, or polygonal. The coil guide 620 may have a shape capable of accommodating a circular, elliptical, or a polygonal shape.

In some implementations, the coil guide 620 may be integrally formed with the top case 610.

In some implementations, the coil guide 620 may be omitted.

The at least one coil 520 may be a coil for power transmission. The at least one coil 520 may be disposed on the at least one ferrite plate 510.

When the wireless charging pad 500 functions as the transmitting pad 14, the at least one coil 520 may be described as the transmitting coil 15.

When the wireless charging pad 500 functions as the receiving pad 15, the at least one coil 520 may be described as the receiving coil 25.

The at least one coil 520 may be formed in spiral.

The at least one coil 520 may be wound to thereby have an external appearance that is circular, elliptical, or polygonal.

The at least one coil 520 may include a first end 521 and a second end 529.

The first end 521 may function as an input end or an output end of the wireless charging pad 500.

The second end 529 may be connected with at least one flat type capacitor 600 of the resonance tank 530 by a first wire 611.

The at least one coil 520 may be positioned between the coil guide 620 and the at least one ferrite plate 510.

The at least one ferrite plate 510 may have a shape of a circular, elliptical, or polygonal plate.

In some implementations, the at least one ferrite plate 510 may be formed in plural.

The at least one ferrite plate 510 may include a hole 5111 that penetrates a top surface and a bottom surface of the at least one ferrite plate 510.

The top surface of the at least one ferrite plate 510 may be a surface that faces at least one of the top case 610, the coil guide 620, or the at least one coil 520.

The bottom surface of the at least one ferrite plate 510 may be a surface that faces at least one of the aluminum plate 630, the insulation sheet 640, the resonance tank 530, or the bottom case 650.

The at least one ferrite plate 510 may define a groove 5121 in the bottom surface thereof.

The at least one ferrite plate 510 may be positioned between the at least one coil 520 and the resonance tank 530.

In some implementations, the aluminum plate 630 and the insulation sheet 640 may be positioned between the at least one ferrite plate 510 and the resonance tank 530.

The aluminum plate 630 may shield a magnetic field.

The aluminum plate 630 may shield may shield a magnetic field generated in the course of power transmission and/or power reception, so that leakage of the magnetic field is prevented.

The aluminum plate 630 may perform a heat dissipating function.

The aluminum plate 630 may induce, to the outside of the wireless charging pad 500, heat that is generated in the at least one coil 520 and/or the at least one ferrite plate 510 in the course of power transmission and/or power reception.

The aluminum plate 630 may be positioned between the at least one ferrite plate 510 and the bottom case 650.

For example, the aluminum plate 630 may be disposed under the at least one ferrite plate 510.

In some implementations, the aluminum plate 630 may have a hole formed therein to insert the first wire 611.

The insulation sheet 640 may shield an undesired current.

For example, the insulation sheet 640 may shield a surface current flowing on the at least one ferrite plate 510.

For example, the insulation sheet 640 may shield a current, so that a capacitor of the resonance tank 530 is electrically isolated from other elements of the wireless charging pad 500.

The insulation sheet 640 may be positioned between the at least one ferrite plate 510 and the bottom case 650.

For example, the insulation sheet 640 may be positioned between the aluminum plate 630 and the at least one flat type capacitor 600.

In some implementations, the insulation sheet 640 may have a hole formed therein to insert the first wire 611.

The resonance tank 530 may be called a tank circuit, a resonance circuit, a resonance tank, a resonance tank circuit, or the like.

The resonance tank 530 may be provided to compensate for an impedance of the at least one coil 520.

The resonance tank 530 may include the at least one flat type capacitor 600.

In some cases, a resonance tank 530 may be included in a circuit, separately from a transmitting pad 14 or a receiving pad 21.

In this case, when the resonance tank 530 may be coupled to a product made by a different company, it may be inevitable to modify a case and a heat dissipating structure in order to modify a parameter for a resonance part included in the circuit.

Since the wireless charging pad 500 according to the present disclosure includes the resonance tank 530, the wireless charging pad 500 may be coupled to a product by a different company if a flat type capacitor is changed. That is, the wireless charging pad 500 has an advantage in that it is easy to modify a parameter for the resonance part. In addition, the parameter for the resonance part may be modified even without changing a cooling structure or an external appearance by changing molding of the wireless charging pad 500.

Since the wireless charging pad 500 according to the present disclosure employs a flat type capacitor, the external appearance of the wireless charging pad 500 may be formed flat. Due to the flat external appearance, it is easy (for a transmitting pad) to be installed at the ground or (for a receiving pad) to be installed in a vehicle.

The at least one flat type capacitor 600 may be disposed under the at least one ferrite plate 510.

The at least one flat type capacitor 600 may be electrically connected with the at least one coil 520 by the first wire 611 inserted through the hole 5111.

The at least one flat type capacitor 600 may be electrically connected with an external device by a second wire 612 disposed in the groove 5121.

Due to the above structure, there is an advantage in that a sufficient insulation distance is secured to prevent an induced voltage from occurring at both ends of the coil.

In addition, due to the above structure, it is possible to provide a flat wireless charging pad 500 having a small volume.

In some implementations, the external device may refer to a device external to the wireless charging pad 500.

For example, when the wireless charging pad 500 is used as the transmitting pad 14, the external device may be a circuit. In this case, the circuit may be a concept including at least one of the DC/AC inverter 12, the AC/DC converter 11, or the grid 1.

For example, when the wireless charging pad 500 is used as the receiving pad 21, the external device may be a circuit. In this case, the circuit may be a concept including the rectifier 23 or the battery 30.

The at least one flat type capacitor 600 may be configured in plural.

The at least one flat type capacitor 600 may include a first capacitor 601 and a second capacitor 602.

The first capacitor 601 may be connected in series with the at least one coil 520 by the first wire 611.

The second capacitor 02 may be connected in series with the first capacitor 601.

In some implementations, the second capacitor 602 may be connected in parallel with the first capacitor 601.

The second capacitor 602 may be connected with an external device by the second wire 612.

At least one capacitor 603 or 604 may be connected in series between the first capacitor 601 and the second capacitor 602.

Capacitance may be adjusted according to the number of plural capacitors connected in series between the first capacitor 601 and the second capacitor 602.

Capacitance may be adjusted according to in-series or in-parallel connection of plural capacitors including the first capacitor 601 and the second capacitor 602.

In some implementations, the second wire 612 may include a first end 621 and a second 629.

The first end 621 may be connected with the at least one flat type capacitor 600.

The second end 629 may be connected with an external device.

The second end 629 may function as an input end or an output end of the wireless charging pad 500.

For example, when the first end 521 of the at least one coil 520 functions as an input end of the wireless charging pad 500, the second end 629 of the second wire 612 may function as an output end of the wireless charging pad 500.

For example, when the first end 521 of the at least one coil 520 functions as an output end of the wireless charging pad 500, the second end 629 of the second wire 612 may function as an input end of the wireless charging pad 500.

The resonance tank 530 may be positioned between the at least one ferrite plate 510 and the bottom case 650.

In some implementations, the aluminum plate 630, the insulation sheet 640, and the resonance tank 530 may be arranged in different order from FIG. 5 between the bottom case 650 and the at least one ferrite plate 510.

For example, the insulation sheet 640, the aluminum plate 630, and the resonance tank 530 may be arranged in order.

For example, the resonance tank 530, the insulation sheet 640, and the aluminum plate 630 may be arranged in order.

For example, the resonance tank 530, the aluminum plate 630, and the insulation sheet 640 may be arranged in order.

The bottom case 650 may form an external appearance of the wireless charging pad 500 together with the top case 610.

The bottom case 650 may be coupled to the top case 610 to form a space therebetween.

Figure 7A:
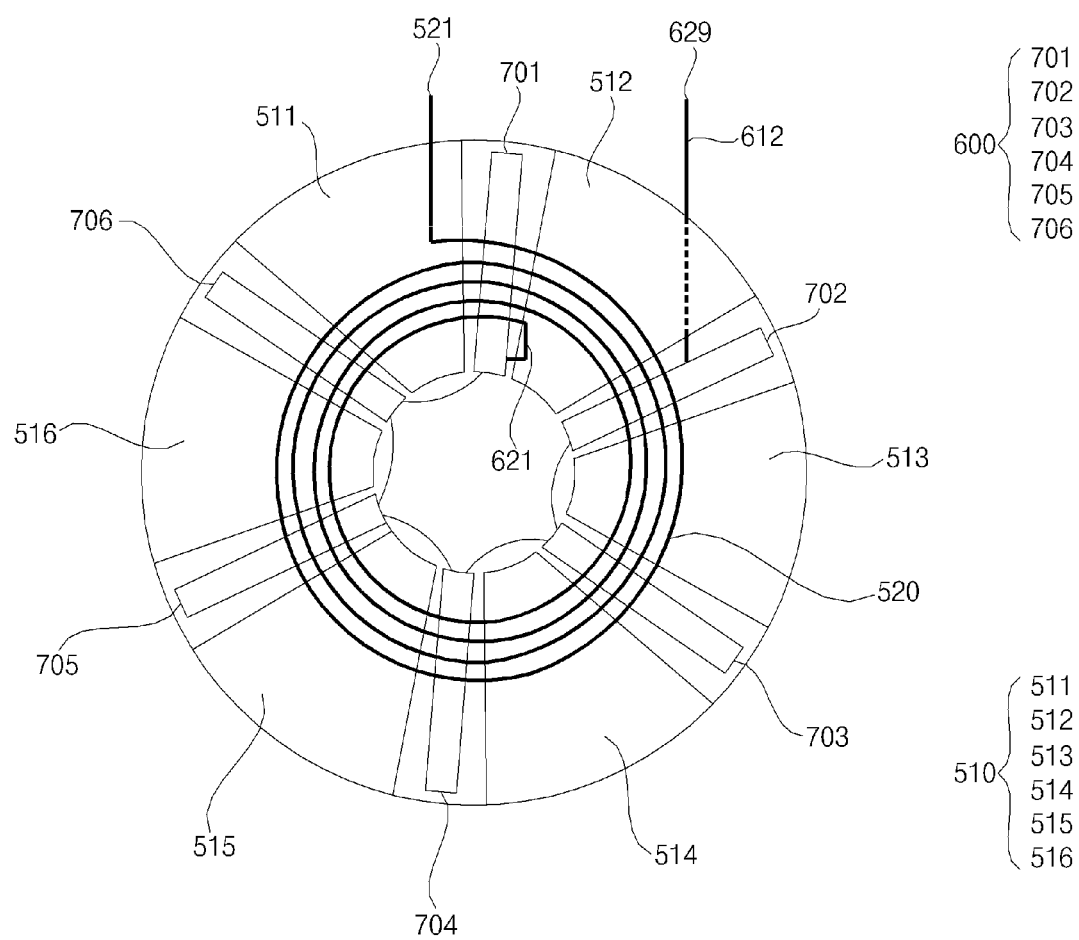
FIGS. 7A and 7B are diagrams for explanation of an example wireless charging pad.
Figure 7B:
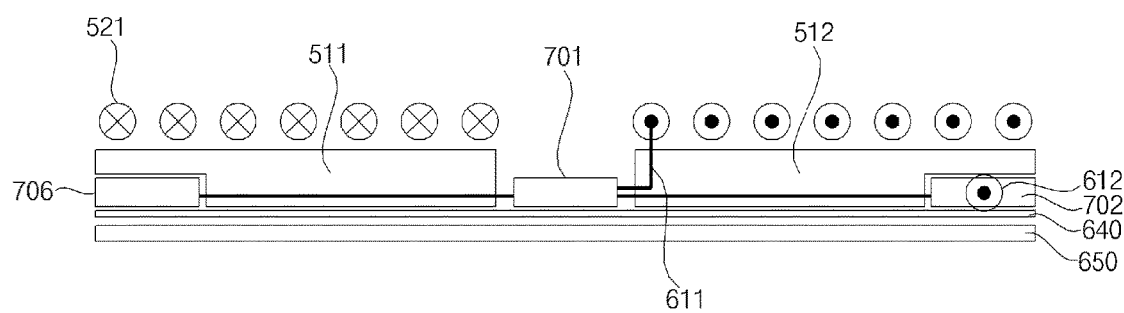

FIGS. 7A and 7B are diagrams for explanation of a wireless charging pad according to an implementation of the present disclosure.

The above description about the wireless charging pad in FIGS. 6A and 6B may apply to a wireless charging pad in FIGS. 7A and 7B.

Referring to FIGS. 7A and 7B, the at least one ferrite plate 510 may include a plurality of ferrite plates 511, 512, 513, 514, 515, and 516.

For example, the at least one ferrite plate 510 may include first to sixth ferrite plates 511, 512, 513, 514, 515, and 516.

Each of the plurality of ferrite plates 511, 512, 513, 514, 515, and 516 may have a shape defined by two straight lines, a first arc connected to the two straight lines, and a second arc having a radius greater than a radius of the first arc. For example, each of the plurality of ferrite plates 511, 512, 513, 514, 515, and 516 may have two straight sides, a first arc side that connects one ends of the two straight sides and that has a first radius, and a second arc side that connects the other ends of the two straight sides and that has a second radius greater than the first radius of the first arc side.

Each of the plurality of ferrite plates 511, 512, 513, 514, 515, and 516 may be described as a fan shape that is hollow.

The structure of the ferrite plates allows the at least one coil 520 to be wound in a circular type, thereby increasing efficiency in wireless power transmission.

A plurality of flat type capacitor 600 may be interposed between any two of the plurality of ferrite plates 511, 512, 513, 514, 515, and 516.

The at least one flat type capacitor 600 may include a plurality of capacitors 701, 702, 703, 704, 705, and 706.

For example, the at least one flat type capacitor 600 may include first to sixth capacitors 701, 702, 703, 704, 705, and 706.

The first capacitor 701 may be positioned between the first plate 511 and the second plate 512.

The first capacitor 701 may be connected in series with the at least one coil 520 by the first wire 611.

The second capacitor 702 may be positioned between the second plate 512 and the third plate 513.

The second capacitor 702 may be connected in series with the first capacitor 701.

In some implementations, the second capacitor 702 may be connected in parallel with the first capacitor 701.

The second capacitor 702 may be connected with an external device by the second wire 612.

At least one capacitor 703, 704, 705, or 706 may be connected in series between the first capacitor 701 and the second capacitor 702.

Capacitance may be adjusted according to the number of plural capacitors connected in series between the first capacitor 701 and the second capacitor 702.

Capacitance may be adjusted according to in-series or in-parallel connection of plural capacitors including the first capacitor 701 and the second capacitor 702.

Figure 8A:
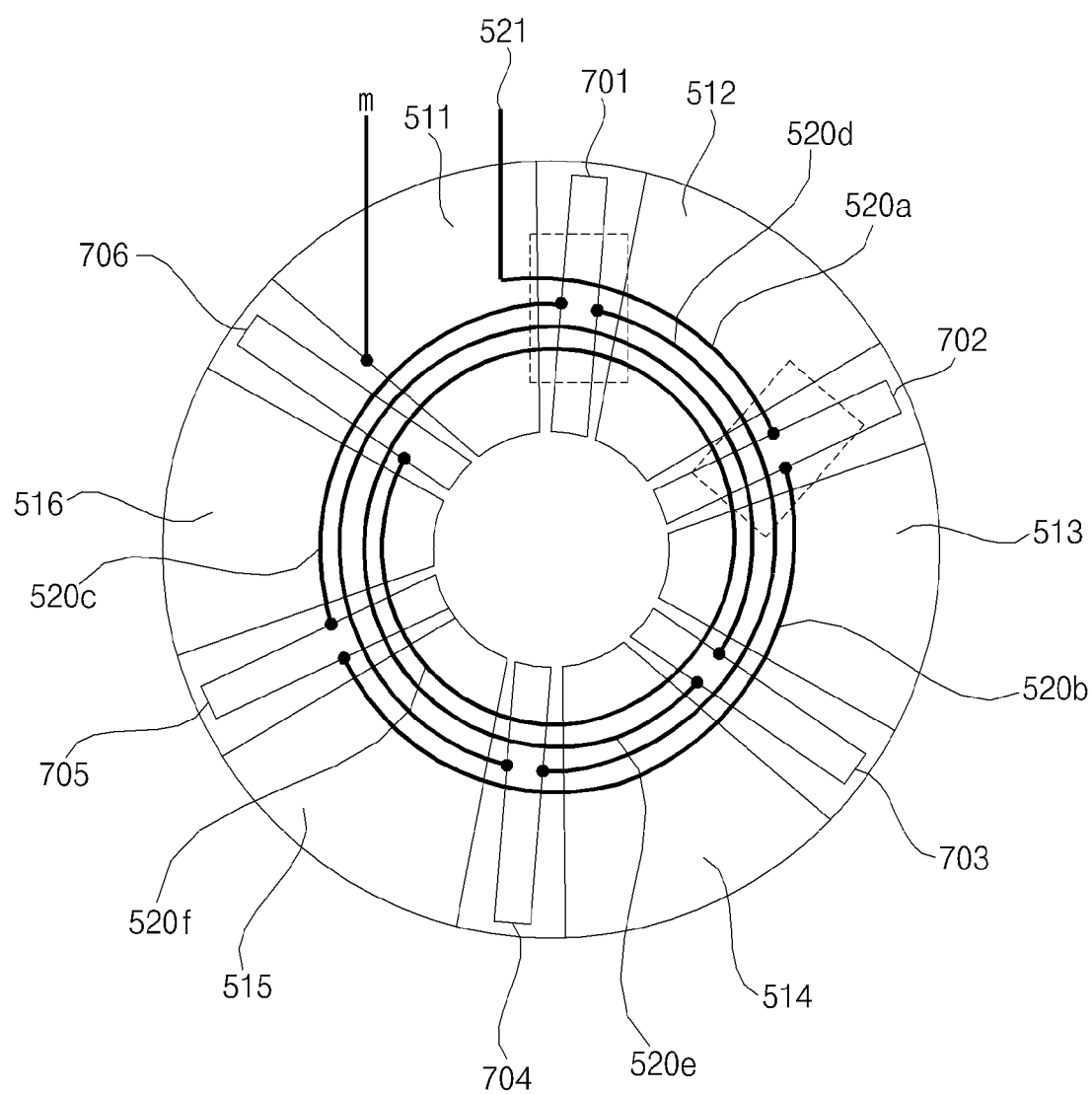
FIGS. 8A to 8C are diagrams for explanation of an example wireless charging pad.
Figure 8B:
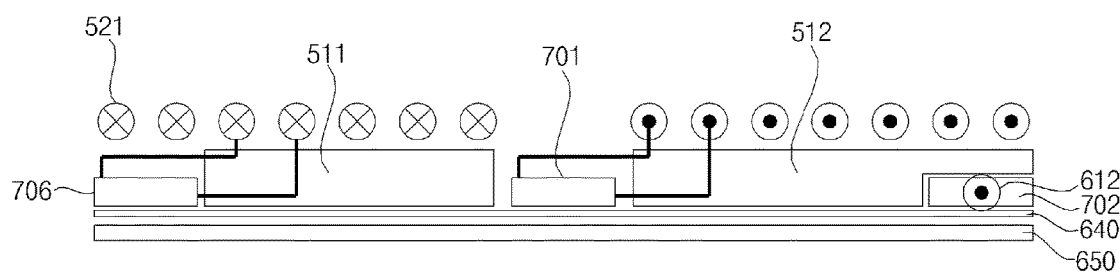
Figure 8C:
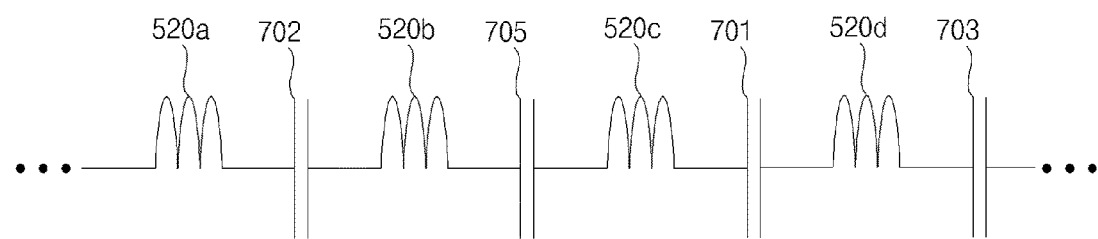

FIGS. 8A to 8C illustrate an example wireless charging pad.

The description about the wireless charging pad in FIGS. 6A and 6B, and the description about the wireless charging pad in FIGS. 7A to 7C may apply to a wireless charging pad in FIGS. 8A to 8C.

Referring to FIGS. 8A and 8B, the at least one coil 520 may include a plurality of sub-coils 520a, 520b, 520c, 520d, 520e, and 520f.

For example, the at least one coil 520 may include first to sixth sub-coils 520a, 520b, 520c, 520d, 520e, and 520f.

For example, the at least one coil 520 may include sub-coils 520a, 520b, 520c, 520d, 520e, and 520f in the same number of the plural capacitors 701, 702, 703, 704, 705, and 706.

The at least one flat type capacitor 600 may include the plurality of capacitors 701, 702, 703, 704, 705, and 706.

For example, the at least one flat type capacitor 600 may include first to sixth capacitors 701, 702, 703, 704, 705, and 706.

The plurality of sub-coils 520a, 520b, 520c, 520d, 520e, and 520f may be alternately connected in series with the plurality of capacitors 702, 703, 704, 705, and 706.

The insulation sheet 640 may be disposed under the at least one ferrite plate 510 and the at least one flat type capacitor 600.

The aluminum plate 630 may be disposed under the insulation sheet 640.

FIG. 8C shows an exemplary equivalent circuit for connection between a plurality of sub-coils and a plurality of capacitors.

As shown in FIG. 8C, the plurality of sub-coils 520a, 520b, 520c, 520d, 520e, and 520f and the plurality of capacitors 702, 703, 704, 705, and 706 may be alternately connected in series.

The first sub-coil 520a may be connected with the second capacitor 702.

The second sub-coil 520b may be connected with the second capacitor 702 and the fifth capacitor 705.

The third sub-coil 520c may be connected with the fifth capacitor 705 and the first capacitor 701.

The fourth sub-coil 520d may be connected with the first capacitor 701 and the fourth capacitor 704.

The fifth sub-coil 520e may be connected with the third capacitor 703 and the sixth capacitor 706.

The sixth sub-coil 520f may be connected with the sixth capacitor 706.

Due to the above structure, there is an advantage in that a portion having excessive inner pressure in the at least one coil 520 and the resonance tank 530 is eliminated.

Due to the above structure, there is an advantage in that thickness of the wireless charging pad 500 is reduced.

In some implementations, FIGS. 6A to 8B show examples of the wireless charging pad 500 and the scope of the present disclosure is not limited by the number of ferrite plates and the number of capacitors.

Figure 9:
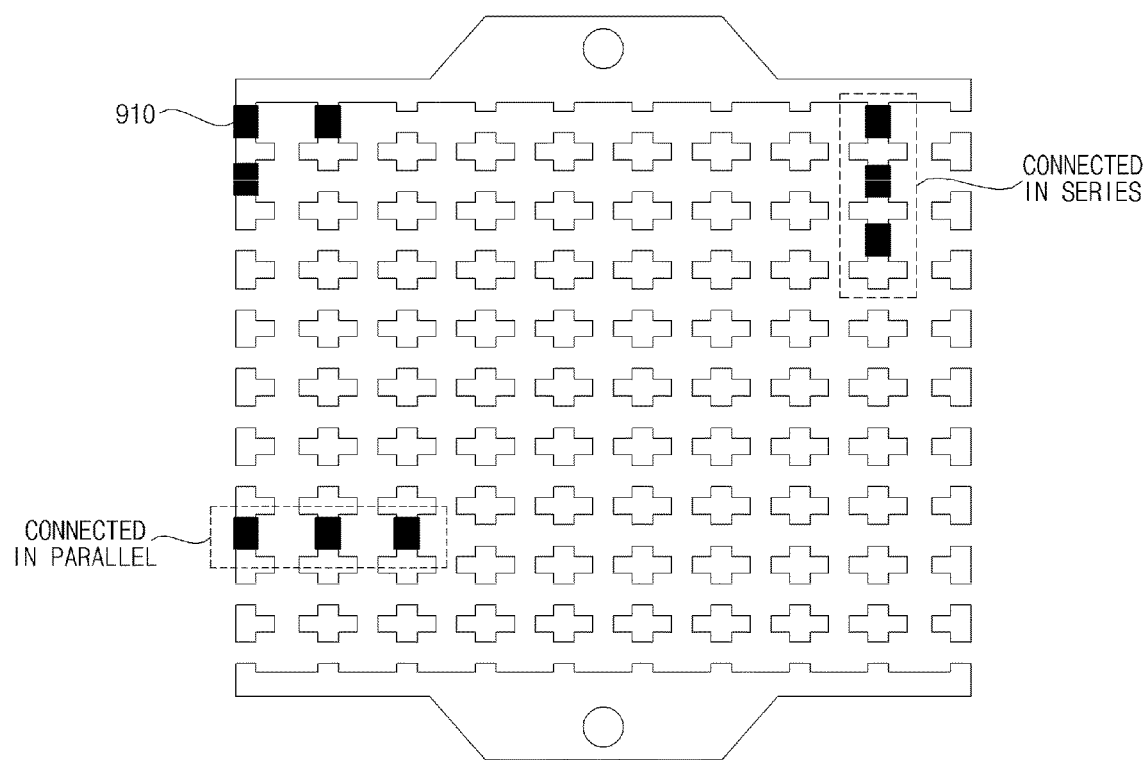
FIGS. 9 and 10 are diagrams for explanation of an example flat type capacitor.
Figure 10:
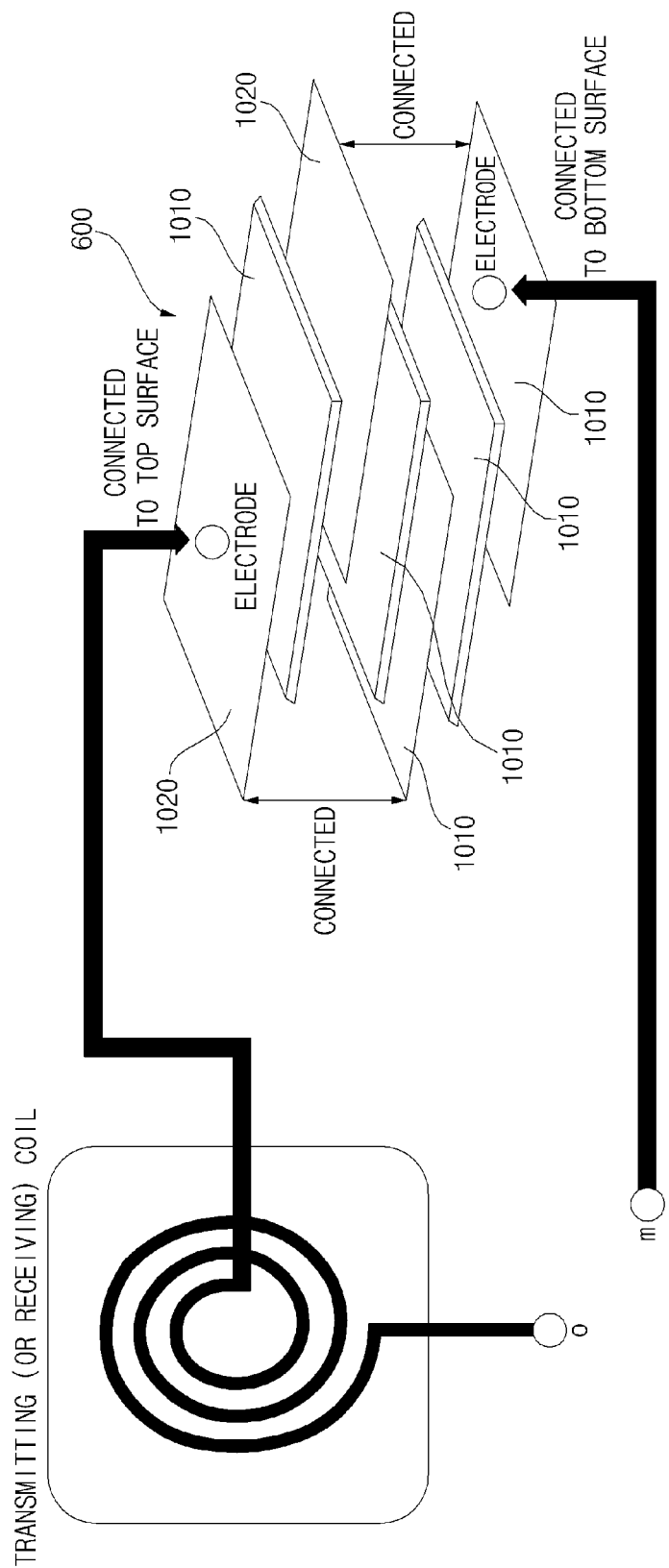

FIGS. 9 and 10 are illustrate an example flat type capacitor.

FIG. 9 shows an example of a flat type capacitor 600 that uses a ceramic material.

Reference numeral 910 refers to a ceramic capacitor 600.

Even by configuring a simple pattern as shown in FIG. 9, a desired in-series or in-parallel structure may be achieved.

If a pattern is implemented for a needed capacity, a flat type ceramic capacitor bank with an optimum size may be configured.

FIG. 10 shows an example of a flat type capacitor 600 that uses a film.

If a film dielectric 1010 is used, electrode plates 1020 are attached to both surfaces of the film dielectric 1010 and deposited, and then, if the both surfaces are connected (x), a film type capacitor 600 having a parallel structure may be achieved.

The flat type capacitor 600 may be defined as a structure included in the wireless charging pad 500 using a large and thin capacitor, which may be different from examples shown in FIGS. 9 and 10.

Since the wireless charging pad 500 has a structure of large plates, if the flat type capacitor 600 is disposed under the at least one ferrite plate 510 or interposed between a plurality of plates 511, 512, 513, 514, 515, and 516, it is possible to remove a resonance part from a circuit and minimize increase in volume of the wireless charging pad 500.

In addition, an induced voltage be3tween an input end and an output end of the wireless charging pad is significantly reduced, thereby decreasing the need for an insulation distance.

In addition, if it is necessary to vary a resonance value, it is not necessary to modify a circuit (a power converter, a rectifier, or the like) that is mechanically fixed.

Figure 11:
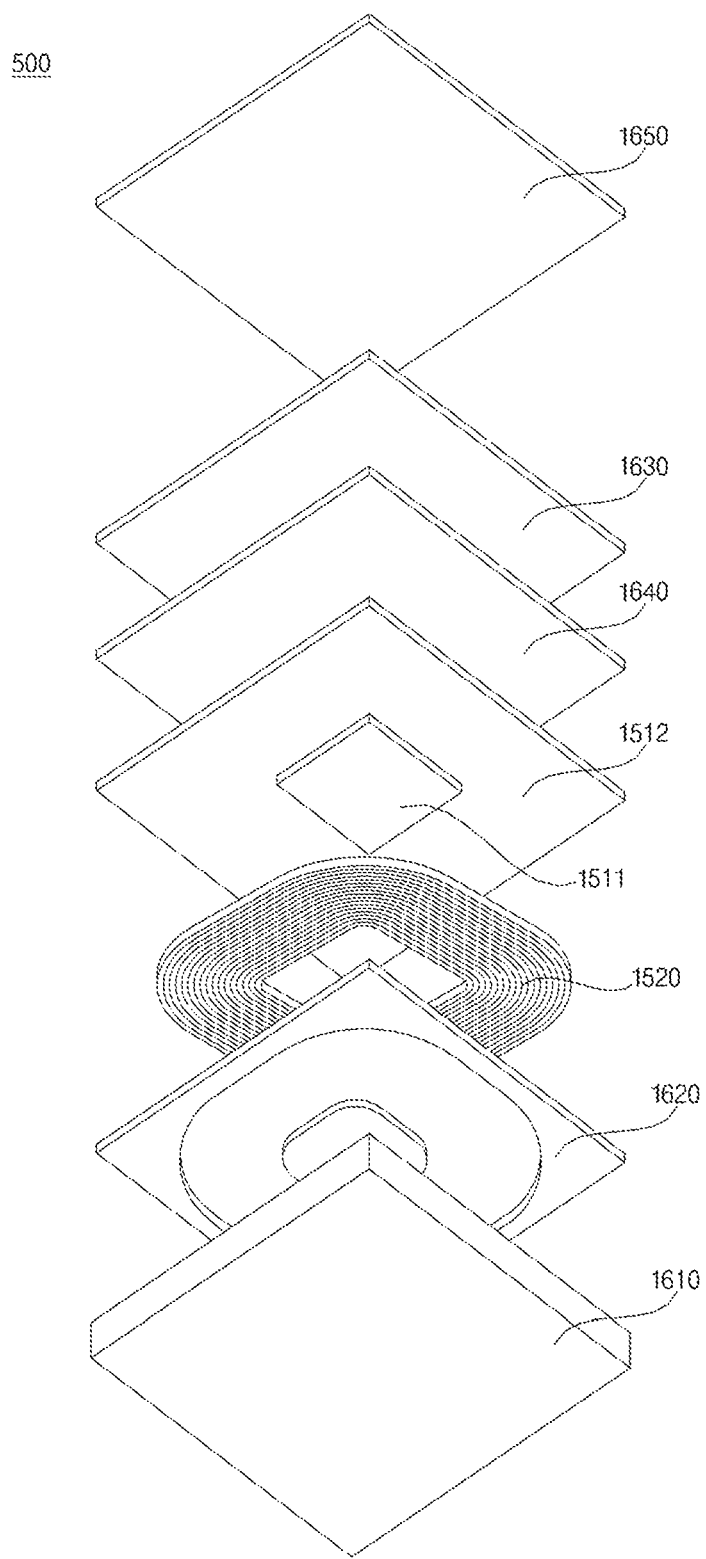
FIG. 11 is a diagram for explanation of an example configuration of an example wireless charging pad.

FIG. 11 illustrates an example configuration of an example wireless charging pad. FIG. 11 shows an exploded perspective view of a wireless charging pad. FIG. 11 is described by exemplifying a receiving pad 21. Elements of a transmitting pad 14 are deposited on the basis of the ground in order reverse to the order in which elements of the receiving pad 21 are deposited, but the description about FIG. 11 may apply to the transmitting pad 14.

Referring to FIG. 11, a wireless charging pad 500 may include a first case 1610, a coil guide 1620, at least one coil 1520, a first magnetic body 1511, a second magnetic body 1512, an aluminum plate 1630, an insulation sheet 1640, and a second case 1650.

The first case 1610 may form an external appearance of the wireless charging pad 500 together with the second case 1650. The first case 1610 may be coupled to the second case 1650 to form a space therebetween. The coil guide 1620, the at least one coil 1520, the first magnetic body (or ferrite plate) 1511, the second magnetic body 1512, the aluminum plate 1630, and the insulation sheet 1640 may be accommodated in the space formed by the first case 1610 and the second case 1650.

The coil guide 1620 may be disposed over or under the at least one coil 1520. When coupled to the at least one coil 1520, the coil guide 1620 may restrict the at least one coil 1520 so that the at least one coil 1520 is fixed and not allowed to move. In some implementations, the coil guide 1620 may be integrally formed with the first case 1610. In some implementations, the coil guide 1620 may be omitted. The at least one coil 1520 may be formed in spiral and have a shape that is circular, elliptical, or polygonal. The coil guide 1620 may have a shape capable of accommodating a circular, elliptical, or polygonal shape.

The at least one coil 1520 may be a coil for power transmission. The at least one coil 1520 may transmit or receive power wirelessly. In some cases, the wireless charging pad 500 may function as a transmitting pad 14, and the at least one coil 1520 may be described as the transmitting coil 15. In some cases, the wireless charging pad 500 may function as a receiving pad 15, and the at least one coil 1520 may be described as the receiving coil 1520. The at least one coil 1520 may be formed in spiral. The at least one coil 1520 may be wound to thereby have an external appearance that is circular, elliptical, or polygonal. The at least one coil 1520 may include a lead-in wire and a lead-out wire.

The first magnetic body 1511 may have a circular, elliptical, or polygonal shape. A magnetic body 510 may be configured as at least one plate. In some examples, the first magnetic body 1511 may include a ferrite. The first magnetic body 1511 may be referred to as a first ferrite plate. The first magnetic body 1511 may be disposed to form layers with the second magnetic body 1512. The first magnetic body 1511 may be disposed over or under the second magnetic body 1512. The first magnetic body 1511 may be disposed on the same layer of the at least one coil 1520.

The second magnetic body 1512 may have a circular, elliptical, or polygonal shape. The magnetic body 510 may be configured as at least one plate. For example, the magnetic body 510 may include a plurality of plates arranged side by side. In some examples, the second magnetic body 1512 may include a ferrite. The second magnetic body 1512 may be referred to as a second ferrite plate. The second magnetic body 1512 may be disposed to form layers with the first magnetic body 1511. The second magnetic body 1512 may be disposed over or under the first magnetic body 1511. The second magnetic body 1512 may be disposed to form layers with the at least one coil 1520. The second magnetic body 1512 may be disposed over or under the at least one coil 1520.

The insulation sheet 1640 may shield an undesired current. For example, the insulation sheet 1640 may shield a surface current flowing in the magnetic body 510. For example, the insulation sheet 1640 may shield a current so that a capacitor of a resonance tank is electrically isolated from other elements of the wireless charging pad 500.

The insulation sheet 1640 may be interposed between the aluminum plate 1630 and the magnetic body 510. The insulation sheet 1640 may be made of any of various insulating materials. For instance, the insulation sheet 1640 may be made of a polycarbonate (PC) material.

The aluminum plate 1630 may shield a magnetic field. The aluminum plate 1630 may shield a magnetic field generated in the course of power transmission and/or power reception, so that leakage of the magnetic field is prevented. The aluminum plate 1630 may perform a heat dissipating function. The aluminum plate 1630 may induce, to the outside of the wireless charging pad 500, heat that is generated in the at least one coil 1520 and/or the magnetic bodies 1511 and 1512 in the course of power transmission and/or power reception.

The aluminum plates 1630 may be interposed between the first and second magnetic bodies 1511 and 1512 and the second case 1650. For example, the aluminum plate 1630 may be disposed under the first and second magnetic bodies 1511 and 1512.

The second case 1650 may form an external appearance of the wireless charging pad 500 together with the first case 1610. The second case 1650 may be coupled to the first case 1610 to form a space therebetween.

Figure 12:
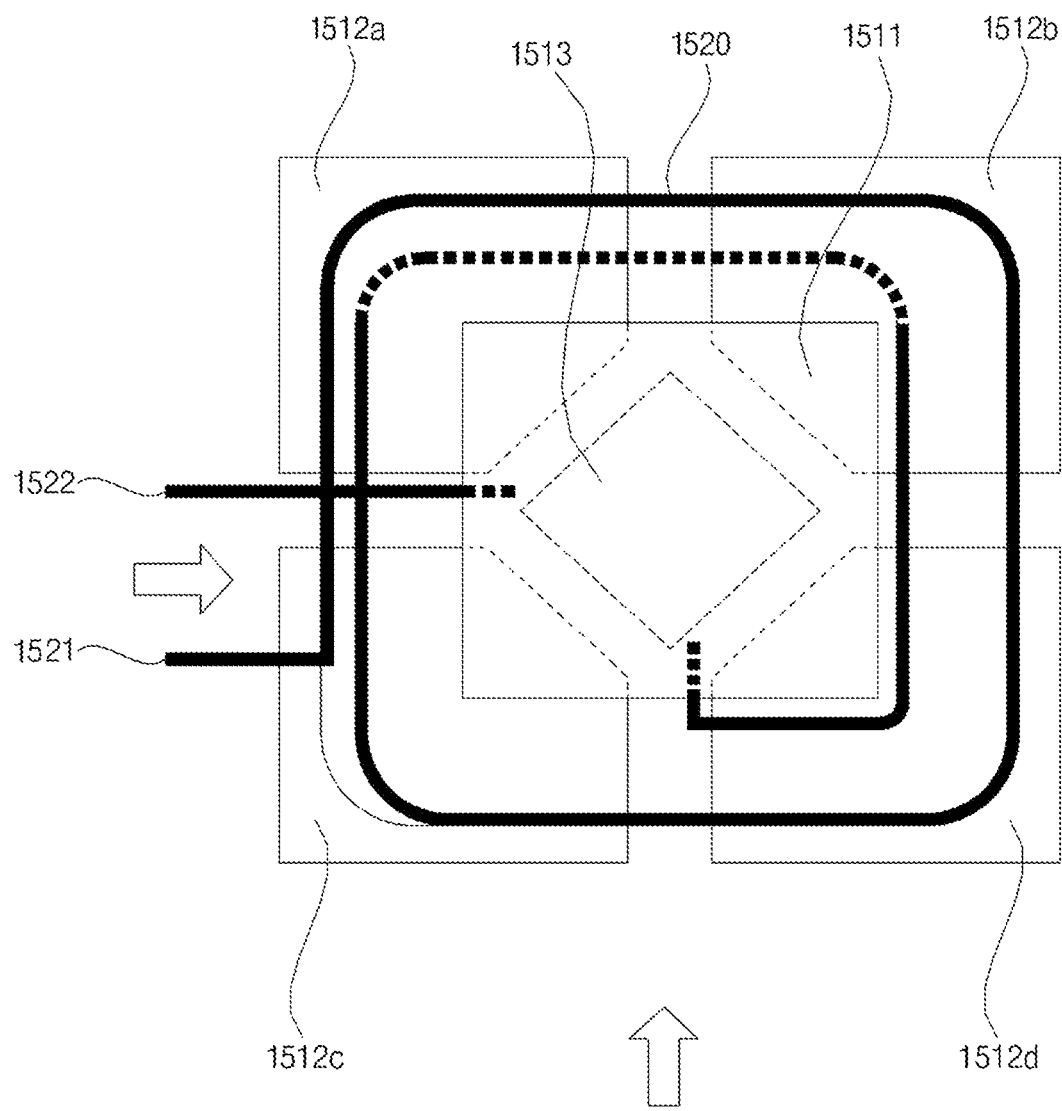
FIGS. 12 to 14 are diagrams for explanation of an example wireless charging pad.
Figure 13:
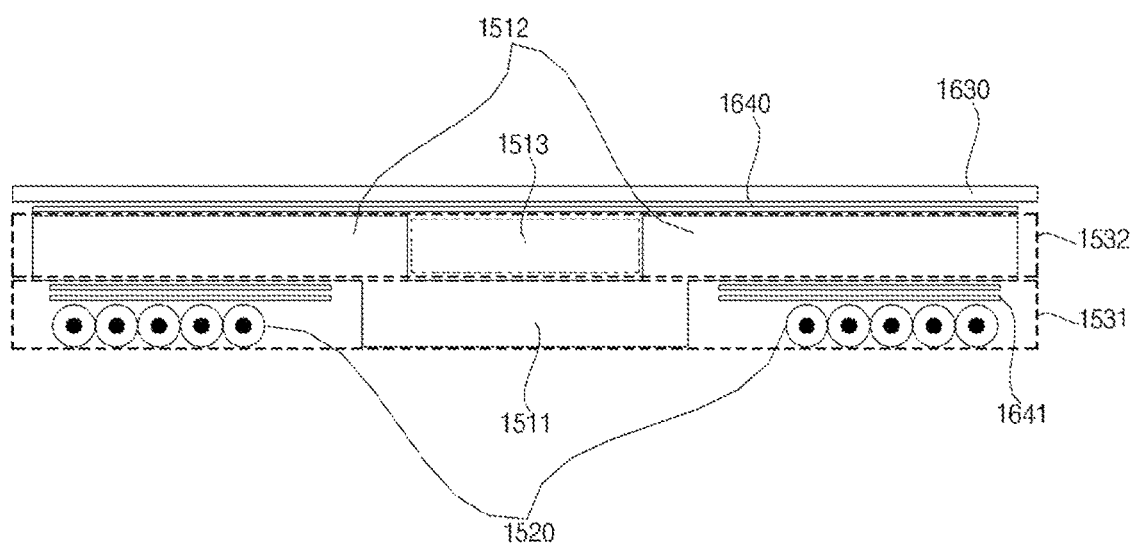
Figure 14:
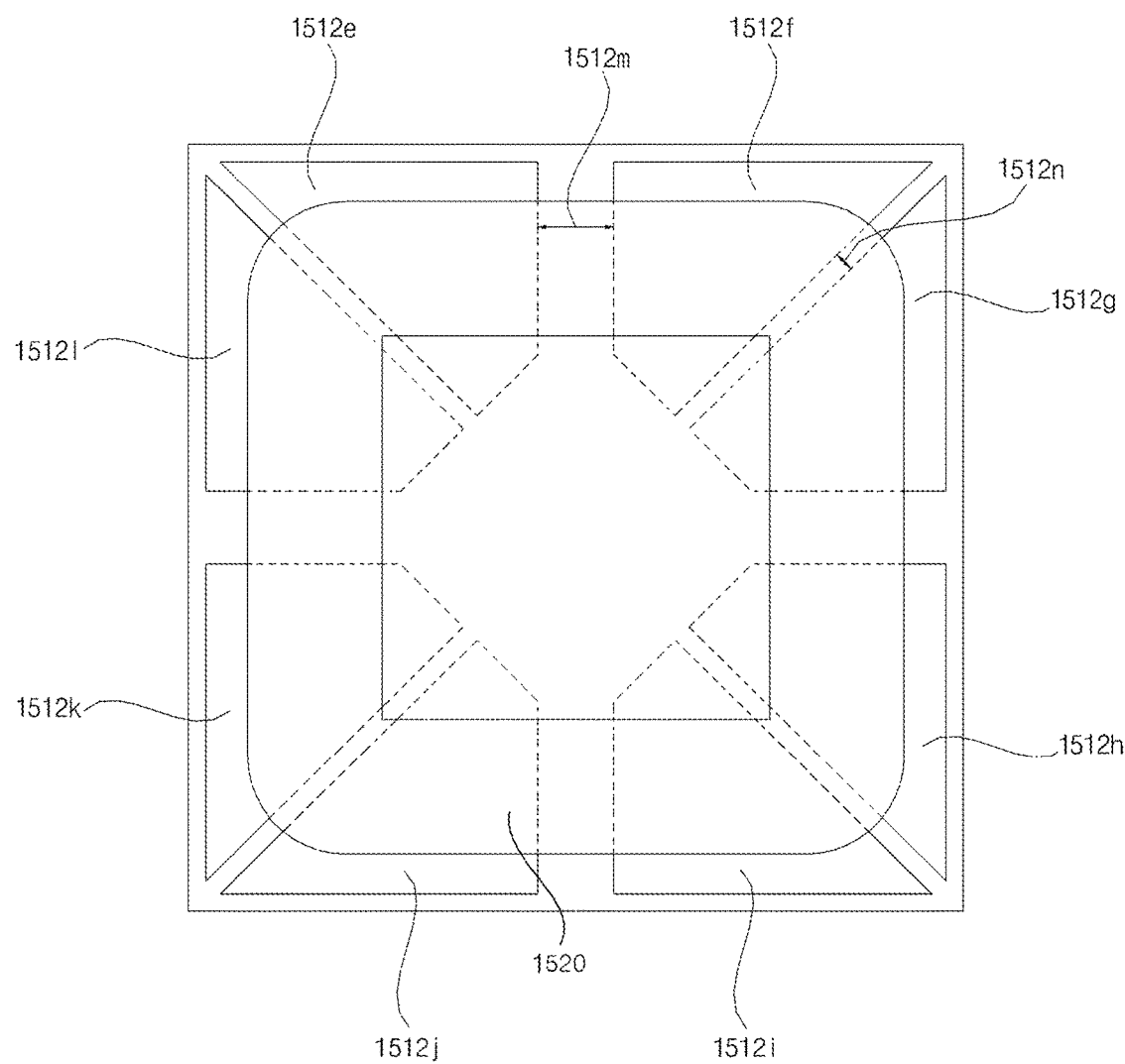

FIGS. 12 to 14 illustrate an example wireless charging pad.

FIGS. 12 to 14 are described by exemplifying a receiving pad 21. Elements of a transmitting pad 14 are deposited on the basis of the ground in order reverse to the order in which elements of the receiving pad 21 are deposited, and the description about FIGS. 12 to 14 may apply to the transmitting pad 14.

FIG. 12 is a bottom view of a wireless charging pad according to an implementation of the present disclosure, and FIG. 13 is a side view of a wireless charging pad according to an implementation of the present disclosure from a direction indicated by an arrow in FIG. 12.

Referring to FIGS. 12 and 13, a first magnetic body 1511 may be disposed to form layers with a second magnetic body 1512. The first magnetic body 1511 may be deposited on the second magnetic body 1512 or the second magnetic body 1512 may be deposited on the first magnetic body 1511. At least part of the first magnetic body 1511 may be in contact with at least part of the second magnetic body 1512. The first magnetic body 1511 may be disposed on the same layer of a coil 1520. At least part of the first magnetic body 1511 may be vertically overlaid with an accommodation space 1513 defined at the second magnetic body 1512.

The second magnetic body 1512 may be disposed to form layers with the first magnetic body 1511. At least part of the second magnetic body 1512 may be in contact with at least part of the first magnetic body 1511. Since the second magnetic body 1512 and the first magnetic body 1511 are in contact with each other, a continuous magnetic path may be formed in the first magnetic body 1511 and the second magnetic body 1512.

The second magnetic body 1512 may define an accommodation space 1513 configured to accommodate at least one electronic component. Due to the continuous magnetic path in the first magnetic body 1511 and the second magnetic body 1512, an eddy current is prevented from affecting the electronic component accommodated within the second magnetic body 1512, and therefore, influence from EMC is minimized and heat by a magnetic field is not generated in the electronic component. At least part of the accommodation space 1513 of the second magnetic body 1512 may be vertically overlaid with the first magnetic body 1511.

The electronic component may include at least one of a converter, an inverter, a rectifier, or a resonance tank. For example, when the wireless charging pad 500 functions as a receiving pad 21, the electronic component may include at least one of the resonance tank 22 or the rectifier 23. For example, the wireless charging pad 500 functions as a transmitting pad 14, the electronic component may include at least one of an AC/DC converter, a DC/AC inverter 12, or a resonance tank 13.

A positional relationship of a first magnetic body 1511, a second magnetic body 1512, and a coil 1520 may be described with reference to layers.

The first layer 1531 may be described as a layer different from a second layer 1532. As shown in FIG. 13, the second layer 1532 may be disposed over the first layer 1531 in a direction upward from the ground. In some implementations, the first layer 1531 may be disposed over the second layer 1532 in the direction upward from the ground.

The first magnetic body 1511 and the coil 1520 may be disposed on the first layer 1531. The second magnetic body 1512 may be disposed on the second layer 1532. Since the first magnetic body 1511, the coil 1520, and the second magnetic body 1512 are disposed as described above, the second magnetic body 1512 may be disposed to form layers with the first magnetic body 1511 and the coil 1520.

The accommodation space 1513 of the second magnetic body 1512 may be positioned on the second layer 1532. Accordingly, an electronic component in the accommodation space 1513 may be disposed on the second layer 1532.

The coil 1520 may be wound around surroundings of the first magnetic body 1511. The wireless charging pad 500 may further include an insulator. The insulator may be disposed between the first magnetic body 1511 and the coil 1520. For example, the insulator may be formed to surround the first magnetic body 1511, and the coil 1520 may be wound to embrace the insulator. In some implementations, the insulator may be made of a polycarbonate (PC) material. The coil 1520 may be disposed over or under the second magnetic body 1512.

In some implementations, the second magnetic body 1512 may include a plurality of sub-magnetic bodies 1512a, 1512b, 1512c, and 1512d. The plurality of sub-magnetic bodies 1512a, 1512b, 1512c, and 1512d may be spaced apart from each other at a predetermined interval. At least part of each of the plurality of sub-magnetic bodies 1512a, 1512b, 1512c, and 1512d may be in contact with at least part of the first magnetic body 1511. At least part of the first magnetic body 1511 may be in contact with at least part of each of the plurality of sub-magnetic bodies 1512a, 1512b, 1512c, and 1512d. A magnetic flux entering into the plurality of sub-magnetic bodies 1512a, 1512b, 1512c, and 1512d from a peripheral area may not flow in gaps between the plurality of sub-magnetic bodies 1512a, 1512b, 1512c, and 1512d, where reluctance is unlimited, but rather may flow in the first magnetic body 1511. Accordingly, a magnetic flux leakage may be reduced significantly.

Since the first magnetic body 1511 and the second magnetic body 1512 are disposed to be layered and at least part of the second magnetic body 1512 is in contact with at least part of the first magnetic body, a magnetic flux flowing into the internal accommodation space 1513 of the second magnetic body 1512 may be reduced significantly.

The coil 1520 may include a lead-in wire 1521 and a lead-out wire 1522. The lead-in wire 1521 and the lead-out wire 1522 of the coil 1520 may be disposed in a gap formed between the plurality of sub-magnetic bodies.

A first internal impedance value seen in an arrow direction by the lead-in wire 1521 and the lead-out wire 1522 with an electronic component being disposed in the accommodation space 1513, is smaller than a second internal impedance value seen by the lead-in wire 1521 and the lead-out wire 1522 with any electronic component being not disposed in the accommodation space 1513. While an electronic component is disposed in the accommodation space 1513, inductance of the coil 1520 is offset by capacitance of the resonance tank 13 or 22, and thus, an internal impedance value is reduced.

Referring to FIG. 14, the second magnetic body 1512 may include a plurality of sub-magnetic bodies 1512e, 1512f, 1512g, 1512h, 1512i, 1512j, 1512k, and 1512l. The plurality of sub-magnetic bodies 1512e, 1512f, 1512g, 1512h, 1512i, 1512j, 1512k, and 1512l may have different shapes.

The plurality of sub-magnetic bodies may include a first sub-magnetic body 1512e, a second sub-magnetic body 1512f, and a third sub-magnetic body 1512g. The second sub-magnetic body 1512f may be disposed in parallel with the first sub-magnetic body 1512e in a first direction. The second sub-magnetic body 1512f may be disposed in parallel with the third sub-magnetic body 1512g in a second direction different from the first direction. A first gap 1512m between the first sub-magnetic body 1512e and the second sub-magnetic body 1512f may be different from a second gap 1512n between the second sub-magnetic body 1512f and the third sub-magnetic body 1512g.

Figure 15:
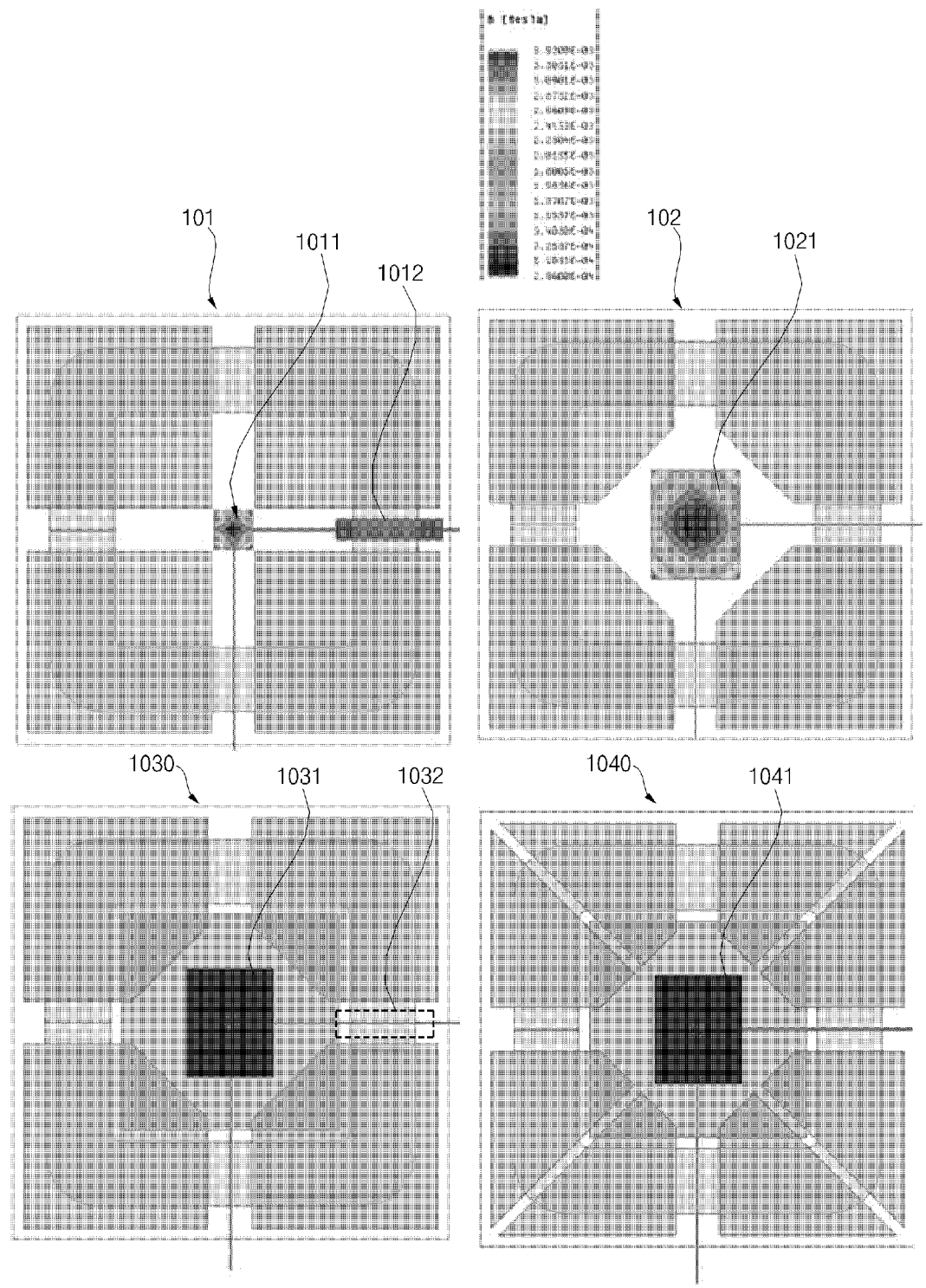
FIG. 15 is a diagram for explanation of example experimental data for an example wireless charging pad.

FIG. 15 shows example experimental data for an example wireless charging pad.

Referring to FIG. 15, a plot 101 indicates a magnetic flux in an example pad including a second magnetic body 1512 comprising a plurality of sub-magnetic bodies spaced apart from each other at a predetermined interval. A plot 102 indicates a magnetic flux in an example when an accommodation space to accommodate an electronic component is secured in a predetermined area at the center of the wireless charging pad 500 by removing a magnetic body from the second magnetic body 1512 in the plot 101. A plot 1030 indicates a magnetic flux in an example when the first magnetic body 1511 is disposed to form layers with and be in contact with the second magnetic body 1512 in the plot 102. A plot 1040 indicates a magnetic flux of when there are included sub-magnetic bodies more than in the plot 1030.

In the plot 101, the greatest magnetic flux is found. In the plot 101, a magnetic path connected between a plurality of sub-magnetic bodies is not secured, and thus, it is found that a magnetic flux linkage of a central area 1011 in the plot 101 is about 44,000 times greater than a magnetic flux linkage of a central area 1031 in the plot 1030. In addition, it is found that a magnetic flux linkage of an area 1012 between sub-magnetic bodies in the plot 101 is about 250,000 times greater than a magnetic flux linkage of an area 1032 between sub-magnetic bodies in the plot 1030.

In the case where a Cu bus bar is positioned in the area 1012 between sub-magnetic bodies in the plot 101, it is found that the bus bar increases in temperature by about 40 degrees or more. Yet, in the case where the Cu bus bar is positioned in the area 1032 between sub-magnetic bodies in the plot 1030, it is found that the bus bar increases in temperature by about 10 degrees or less.

It may be found that a magnetic flux linkage of the central area 1021 in the plot 102 is about 20,000 times greater than a magnetic flux linkage of the central area 1031 in the plot 1030.

It may be found that a magnetic flux linkage in the plot 1030 is almost equal to a magnetic flux linkage in the plot 1040.

While accommodating an electronic component, the wireless charging pad 500 may be less affected by magnetic flux linkage, and therefore, the wireless charging pad may be integrated with the electronic component.

In all aspect, the detailed description of present disclosure is intended to be understood and interpreted as an exemplary implementation of the present disclosure without limitation. The scope of the present disclosure shall be decided based upon a reasonable interpretation of the appended claims of the present disclosure and shall come within the scope of the appended claims and their equivalents.

What is claimed is:

1. A wireless charging pad comprising:
   a ferrite plate;
   a coil disposed on the ferrite plate; and
   a resonance tank comprising a flat type capacitor, the flat type capacitor being configured to reduce an impedance of the coil,
   wherein the flat type capacitor comprises:
      a first capacitor that is connected electrically in series with the coil, and
      a second capacitor that is connected electrically in series with the first capacitor, and
   wherein the first capacitor and the second capacitor have a flat shape and are arranged on a common plane.

2. The wireless charging pad of claim 1, wherein the flat type capacitor is disposed vertically below the ferrite plate.

3. The wireless charging pad of claim 2, wherein the ferrite plate defines a hole that penetrates a top surface of the ferrite plate and a bottom surface of the ferrite plate, and
   wherein the flat type capacitor is electrically connected with the coil by a first wire inserted through the hole.

4. The wireless charging pad of claim 3, wherein the ferrite plate defines a groove at the bottom surface, and
   wherein the flat type capacitor is electrically connected with an external device by a second wire disposed in the groove.

5. The wireless charging pad of claim 4, wherein:
   the first capacitor is connected electrically in series with the coil by the first wire; and
   the second capacitor is connected electrically in series with the first capacitor and connected with the external device by the second wire.

6. The wireless charging pad of claim 2, further comprising:
   an aluminum plate disposed vertically below the ferrite plate; and
   an insulation sheet disposed between the aluminum plate and the flat type capacitor.

7. The wireless charging pad of claim 1, wherein the ferrite plate comprises a plurality of ferrite plates, and
   wherein the flat type capacitor is disposed between any two of the plurality of ferrite plates.

8. The wireless charging pad of claim 1, further comprising a case that is disposed below the first capacitor and the second capacitor and has a surface defining the common plane.

9. The wireless charging pad of claim 7, wherein the coil comprises a plurality of sub-coils,
   wherein the flat type capacitor comprises a plurality of capacitors, and
   wherein the plurality of sub-coils and the plurality of capacitors are alternately connected electrically in series in which one capacitor of the plurality of capacitors is connected between two sub-coils of the plurality of sub-coils.

10. The wireless charging pad of claim 7, wherein each of the plurality of ferrite plates has:
    two straight sides, each straight side extending from a first end to a second end;
    a first arc side that connects the first ends of the two straight sides and that has a first radius of curvature; and
    a second arc side that connects the second ends of the two straight sides and that has a second radius of curvature greater than the first radius of curvature.

11. A wireless charging pad comprising:
    a first ferrite plate disposed at a first layer of the wireless charging pad;
    a second ferrite plate disposed at a second layer of the wireless charging pad, the second ferrite plate being disposed vertically above or below the first ferrite plate; and
    a coil that is wound around the first ferrite plate and that is disposed vertically above or below the second ferrite plate,
    wherein the second ferrite plate comprises a plurality of sub-magnetic bodies that are arranged on a common plane and spaced apart from one another by a separation distance to thereby define an accommodation space between the plurality of sub-magnetic bodies.

12. The wireless charging pad of claim 11, wherein at least a part of the second ferrite plate is in contact with at least a part of the first ferrite plate.

13. The wireless charging pad of claim 12, wherein the first ferrite plate and the second ferrite plate are configured to define a continuous magnetic path passing the first ferrite plate and the second ferrite plate.

14. The wireless charging pad of claim 11, wherein the accommodation space is configured to accommodate an electronic component.

15. The wireless charging pad of claim 14, wherein at least a part of the first ferrite plate overlaps with the accommodation space.

16. The wireless charging pad of claim 14, wherein the coil is disposed at the first layer.

17. The wireless charging pad of claim 16, wherein the electronic component is disposed at the second layer, and wherein the electronic component comprises at least one of a converter, an inverter, a rectifier, or a resonance tank.

18. The wireless charging pad of claim 14, wherein the coil comprises a lead-in wire and a lead-out wire that are disposed in a gap defined between the plurality of sub-magnetic bodies.

19. The wireless charging pad of claim 18, wherein the second ferrite plate is configured to, based on the electronic component being disposed in the accommodation space of the second ferrite plate, define a first internal impedance of the lead-in wire and the lead-out wire to be less than a second internal impedance of the lead-in wire and the lead-out wire defined without the electronic component disposed in the accommodation space.

20. The wireless charging pad of claim 11, further comprising an insulator disposed between the first ferrite plate and the coil.

* * * * *